United States Patent [19]

Lubcke et al.

[11] Patent Number: 4,500,991
[45] Date of Patent: Feb. 19, 1985

[54] CIRCUIT ARRANGEMENT FOR THE CONTROL OF THE TRANSMISSION OF DIGITAL SIGNALS, PARTICULARLY PCM-SIGNALS, BETWEEN STATIONS OF A TIME DIVISION MULTIPLEX TELECOMMUNICATION NETWORK PARTICULARLY PCM-TIME DIVISION MULTIPLEX TELECOMMUNICATION NETWORK

[75] Inventors: Hartmut Lubcke; Martin Backhaus, both of Paderborn, Fed. Rep. of Germany

[73] Assignee: Nixdorf Computer AG, Furstenallee, Fed. Rep. of Germany

[21] Appl. No.: 384,275

[22] Filed: Jun. 2, 1982

Related U.S. Application Data

[63] Continuation of Ser. No. 140,872, Apr. 16, 1980, abandoned.

[30] Foreign Application Priority Data

Apr. 17, 1979 [DE] Fed. Rep. of Germany ....... 2915488

[51] Int. Cl.³ .............................................. H04J 3/06
[52] U.S. Cl. ................................ 370/88; 340/825.16; 370/105; 375/107
[58] Field of Search ....................... 370/26, 77, 80, 85, 370/86, 87, 88, 100, 105; 371/47, 48; 178/69 R, 63 E; 340/825.06, 825.16, 825.5; 375/108, 107

[56] References Cited

U.S. PATENT DOCUMENTS

| | | | |
|---|---|---|---|
| 3,732,374 | 5/1973 | Rocher et al. | 370/88 |
| 4,048,446 | 9/1977 | Hafner et al. | 370/86 |
| 4,063,220 | 12/1977 | Metcalf et al. | 340/825.5 |
| 4,078,228 | 3/1978 | Miyazaki | 370/86 |
| 4,144,448 | 3/1979 | Pisciotta et al. | 375/108 |

Primary Examiner—Benedict V. Safourek
Attorney, Agent, or Firm—Freilich, Hornbaker, Rosen & Fernandez

[57] ABSTRACT

The invention comprises a circuit arrangement for the control of digital signal transmission, particularly PCM-signals, between stations of a time division multiplex telecommunication system, particularly a PCM-time division multiplex telecommunication system, with a central control unit, via a multiplex channel to which every station can be connected and on which every station included in a connection is allocated a transmission pulse with cyclically repeated time slots occurring in successive pulse frames and a reception pulse with cyclically repeated time slots occurring in successive pulse frames, with stations combined in a group of stations jointly connected to a transmission trunk by their transmission outputs and to a reception trunk by their reception inputs, and with all trunks connected to the multiplex line via amplifiers. In this context digital signals are understood to be voice signals and data.

4 Claims, 5 Drawing Figures

CIRCUIT ARRANGEMENT FOR THE CONTROL OF THE TRANSMISSION OF DIGITAL SIGNALS, PARTICULARLY PCM-SIGNALS, BETWEEN STATIONS OF A TIME DIVISION MULTIPLEX TELECOMMUNICATION NETWORK PARTICULARLY PCM-TIME DIVISION MULTIPLEX TELECOMMUNICATION NETWORK

This is a continuation of application Ser. No. 140,872, filed Apr. 16, 1980, now abandoned.

BACKGROUND OF THE INVENTION

1. Field of the Invention

The present invention relates to improvements in the circuit arrangements for the control of digital signal transmission, particularly PCM-signals, between stations of a time division multiplex telecommunication system.

2. Description of the Prior Art

Several systems of the above described type have been proposed and described in the prior art. One of the prior art systems is described in published German Application De-OS No. 20 64 530. The major disadvantage of this known circuit arrangement is that a separate multiplex line is required for the traffic between stations of two different station groups and that the amplifiers that must be added between the trunks and the multiplex lines must have different amplification factors. Another disadvantage is that, because of the serial signal transfer over the trunks as well as the multiplex lines, only a relatively small number of subscriber stations can be included in a connection.

A circuit arrangement for the conversion of analog signals, especially those formed by PAM-signals, into PCM-signals, is already known and is described in U.S. Pat. No. 3,984,829. Therein, the signal bits, forming the individual PAM-signals, are received and transmitted in parallel via a corresponding number of individual lines. The circuit arrangement in question thus represents a so-called codec, which connects a subscriber station that transmits or receives analog signals with an exchange. But nothing is known in this connection regarding the structure of a circuit arrangement to control the transmission of digital signals between stations of a time division multiplex telecommunication system and particularly a PCM-time division multiplex telecommunication system.

A circuit arrangement for controlling the transmission of digital signals, particularly PCM-signals, between subscriber stations of a time division multiplex telecommunication system, particularly PCM-time division multiplex telecommunication system and a four-wire mode operated two-wire multiplex line is described in published German Application De-OS No. 27 24 096. Therein, each respective subscriber station is allocated one transmission pulse for a signal transmission and a chronologically separate reception pulse for a signal reception on the respective multiplex line. Each subscriber station is connected with the input of a transmission memory and the output of a reception memory via a coding-decoding arrangement, particularly one operating on the iterative principle, i.e., a codec. A decentralized holding set circuit is associated to the respective subscriber station for the control of signal storage in the reception memory and for the control of the reading out of signals from the transmission memory. In this decentralized aggregate halt circuit the counter positions of a cyclically operated counter—which can be set to one of the number of counter positions that corresponds to the number of the pulses available on the two-wire multiplex line for a signal transmission during the duration of each of the relevant pulse frames on the two-wire multiplex line—are compared with a reception pulse address that corresponds to the reception impulse serving to control the associated reception memory, and with a transmission pulse address that corresponds to the transmission pulse serving to control the associated transmission memory. When agreement is detected between one counter position of the counter and the reception pulse address and another counter position of the counter and the transmission pulse address, a corresponding control signal is transmitted by the respective decentralized holding set circuit to control the storage of a signal in the reception memory, or to control the reading out of a signal from the transmission memory of the associated subscriber station. Since in this familiar circuit arrangement the transmission memory associated to the respective subscriber station and the reception memory associated to the respective subscriber station merely serve as buffer memories for a serial signal bit transmission, also an exchange arrangement equipped with such subscriber stations has the disadvantage that it only provides for a relatively small number of connections altogether. At this point it should be noted that the possibility does exist to connect multiplex lines associated to the individual station groups or subscriber station groups via a space coupling arrangement, in order to raise the number of connections that can be established or can exist at the same time. But this entails an often undesirable, additional circuit complexity.

Another telecommunication system for a multi-branched junction network operating on the time division multiplex principle is described in U.S. Pat. No. 3,846,587. Therein, individual subscriber stations are connected by one transmission and one return line each, along the network branches, on the multiple access principle. In this familiar telecommunication system a synchronizing word generator can periodically transmit a synchronizing word from a central location of the network in a basically familiar manner, in order to form a time frame. At the extreme ends of the telecommunication system, the synchronizing word can be transferred from the transmission line to the return line. At each subscriber station the interval between two synchronization words can be divided into equal time slots by a bit cycle and time slot cycle unit in a basically familiar manner. The information emanating from a transmitting subscriber station can thus be transmitted as a block of information in one time slot. The address of the selected subscriber can be placed ahead of each information block to be transmitted, and by use of an address evaluation unit each subscriber station can ascertain whether the own address is contained in the time slots of one of the connected lines, with an address and a block of information completely filling a time slot. A disadvantage of this familiar telecommunication system is that, in spite of the use of closed circuit multiplex lines, only a relatively small number of subscriber stations can be included in connections.

SUMMARY OF THE INVENTION

The present invention solves the disadvantages of the prior at by providing a relatively simple, yet novel and useful arrangement whereby a larger number of practically simultaneously exisiting connections between terminals in circuit arrangements of the initially cited kind is achieved, than is the case with the presently known circuit arrangements.

According to the invention, the above described problem is solved for a circuit arrangement of the initially cited kind by constituting the multiplex line or channel of a closed circuit containing a transmission line and a reception line connected with the transmission line, with a number of individual lines that correspond to at least the number of signal bits of a digital signal that are to be simultaneously transmitted, and by connecting the transmission trunks of all station groups to the individual lines of the transmission line section by a number of individual lines that at least correspond to the number of signal bits of a digital signal that are to be simultaneously transmitted, and the reception trunks of all station groups to the individual lines of the reception line section of the closed circuit with a number of individual lines that at least correspond to the number of signal bits of a digital signal that are to be simultaneously transmitted.

The invention has the advantage that a larger number of practically simultaneously establishable connections between stations is possible in a particularly simple manner with relatively little circuit complexity, than with the previously known corresponding circuit arrangements. This advantage accrues especially from the parallel transmission of the signal bits that form the respective digital signal via a corresponding number of individual lines. On the basis of a conventional PCM-system with 32 trunks at eight bits, one can easily connect subscriber stations representing 1000 connected stations to a single multiplex channel, taking normal traffic loads into account.

The stations belonging to the various station groups are best connected with the central control system via group-individual command trunks. This offers the advantage of safe command control of the individual stations. Besides, in the case of faulty stations, the so-called effective range of failure is relatively small; it is then limited to those station groups that contain faulty stations.

The above mentioned command trunk is expediently laid out for serial signal bit transmission. This advantageously results in particularly low circuit complexity for command signal transmission.

The closed circuit should also contain an additional synchronization signal line. This offers the advantage that all terminals can be operated synchronously with virtual independence of the respective line length. The closed circuit should preferably contain an additional cycle line. This offers the advantage of especially simple cycle control in the individual circuits and especially in the stations.

A monitoring device is preferably connected with every transmission trunk, with which the seizure of time slots that are blocked for connecting purposes on the respective transmission trunk can be monitored and which transmits an error indication signal when the seizure of such a time slot is detected. This offers the advantage of particularly simple and effective monitoring of the individual station groups and hence of the entire system, regarding perfect operation.

A shutdown device is preferably associated to every station group, which can be controlled by the associated monitoring device. This makes it advantageously possible to disconnect a station group from the common closed circuit for all station groups when an error is detected in it.

A diagnostic unit is expediently connected with the closed circuit. This advantageously provides a simple way of testing the serviceability of the closed circuit and of the entire circuit arrangement.

The signal generators required for a signaling task are preferably connected to the respective closed circuit, to which one transmission pulse is permanently associated. This offers the advantage of particularly simple allocation of the signaling signal for the respective connection.

A particularly practical configuration of the invention results from the fact that the individual stations can be incorporated into conference connections, for which purpose reception pulses are allocated to them that correspond to the transmission pulses of the remaining stations included in the respective conference connection, while in the respective station the analog signals corresponding to the respective transmitted digital signal are added. This results in the advantage that conference connections can be produced between stations in a particularly simple manner, which is of special usefulness in the case where the respective stations are subscriber stations.

The duty factor of the analog signals derived from digital signals in the respective station is expediently chosen so that it satisfies the relationship $$T \geq td/To.$$

where td is the decoding time of a digital signal and hence the minimum time interval between two accountable reception time slots, and To the duration of a pulse frame. This offers the advantage that conference connections between stations of the circuit arrangement or exchange can be made with particularly low circuit complexity.

It is of advantage in this connection if a key switch is connected to the input of a filter following a digital analog converter, which can be activated by switching impulses corresponding to the reception time slots. This offers the advantage of particularly low circuit complexity.

The transmission and reception of digital signals in each station are preferably controlled by a holding set circuit associated to the respective station in which the counter positions of a cyclically operated counter arrangement—which can be set to one of a number of counter positions that corresponds to the number of the pulses available on the closed circuit for a signal transmission during the duration of each of the relevant pulse frames on this closed circuit—are compared with a transmission pulse address corresponding to the respective transmission pulse to be used and provided by the central control device and with a reception pulse address corresponding to the respective reception pulse to be used, provided by the central control device.

When agreement is detected between one counter position of the counter arrangement and the transmission pulse address and another counter position of the counter arrangement and the reception pulse address, the respective holding set circuit transmits a corresponding signal to transmit a digital signal to the associated transmission trunk or a corresponding control signal to receive a digital signal from the associated reception trunk. This offers the advantage of particularly low circuit complexity in the central control device and in the individual stations regarding the allocation of the individual transmission pulses and reception pulses.

In this connection it should be noted that the pulse that is allocated to a station as transmission pulse is allocated to another station that is connected with this station as a reception pulse. The pulse that is allocated as transmission pulse to this last named station is allocated to the first named station as reception pulse. The stations are preferably constituted of subscriber stations which are designed for the transmission and reception of analog signals and which are connected to the respective transmission trunk and the respective reception trunk by a codec. This offers the advantage that subscriber stations that process analog signals can be included in connections via the present circuit arrangement in a relatively simple manner.

It is of further advantage in the just discussed circuit arrangement if the respective codec is connected to the respective reception trunk via a reception register and to the respective transmission trunk via a transmission register. This allows a particularly simple series-parallel or parallel-series conversion of the bits forming a digital signal that is to be transmitted.

At least one of the stations is preferably constituted of a transmission device which allows transmission of digital signals to and/or from other signal reception or signal transmission devices. This offers the advantage that the present circuit arrangement according to the invention can interact with other signal reception or signal transmission devices, which may for example be structured in a manner corresponding to the present circuit arrangement.

By use of drawings, the invention is explained in more detail in practical examples below.

DETAILED DESCRIPTION OF THE PREFERRED EMBODIMENTS

Figure 1:
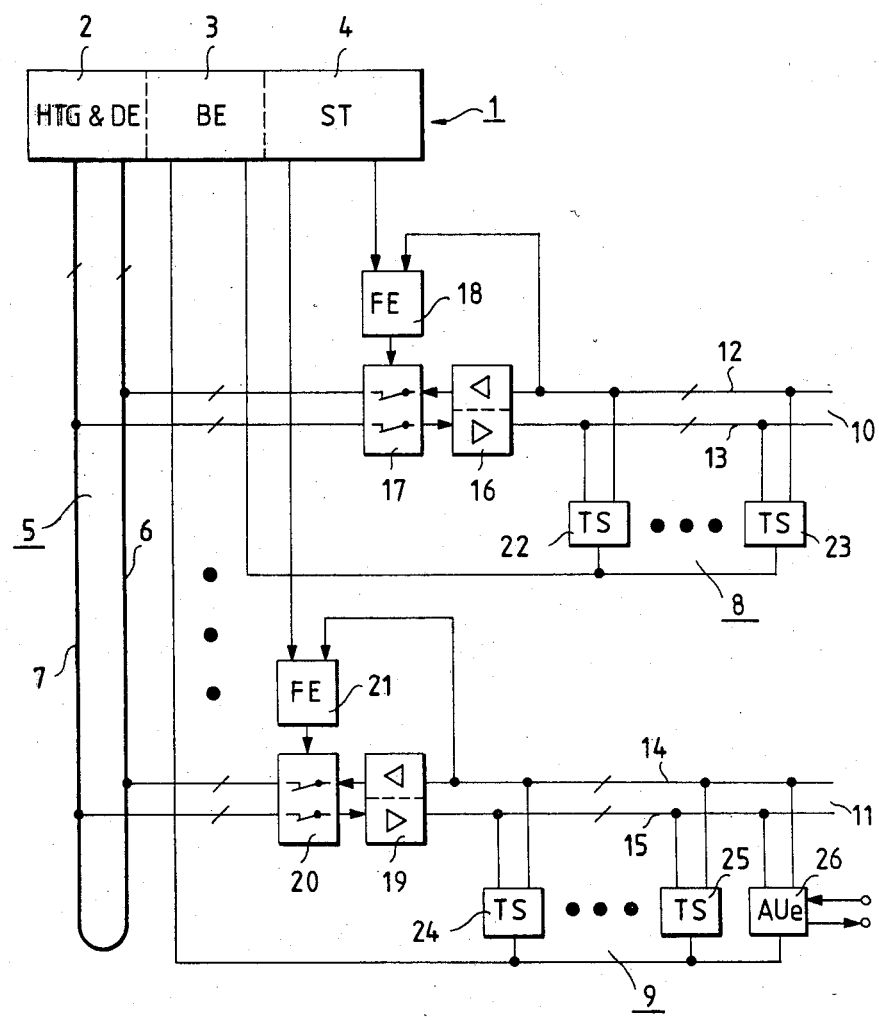
FIG. 1 shows a first embodiment of a circuit arrangement according to the invention in block diagram form.

The circuit arrangement shown in FIG. 1 contains a central control device 1, which may be divided into three control device areas, 2, 3 and 4. The control device area 2 may include signal generators required for signal transmission or audio signal generators (HTG) and a diagnostic unit (DE) with which faulty operating modes of the circuit parts connected with this control device area 2 can be detected. The control device area 3 may comprise a command device (BE) with which the stations and station circuits belonging to the circuit arrangement shown in FIG. 1 can be monitored regarding their state. The respective station circuits can be specifically selected from the control device area 3. The also mentioned control device area 4 of the central control device 1 may contain an addressing control circuit (ST) with which individual monitoring devices of the circuit arrangement can be effectively controlled in succession.

In the circuit arrangement shown in FIG. 1 a multiplex line or channel configured as closed circuit 5 essentially serves to transmit digital signals, which may in particular be formed by PCM-signals. This closed circuit 5 has a transmission line section 6 and a reception line section 7. Each of these two line sections 6, 7 comprises a number of individual lines that at least corresponds to the number of signal bits of a digital signal that are to be simultaneously transmitted. This is indicated in FIG. 1 by the short diagonal lines crossing the respective line sections 6, 7. In the case of a conventional PCM-system with 32 channels at eight bits, the transmission line section 6 and the reception line section 7 of the closed circuit 5 comprise at least eight individual lines each. Besides, each line section of this closed circuit 5 can comprise an additional synchronization signal line as well as a clock line. The corresponding individual lines of the transmission line section 6 and the reception line section 7 of the closed circuit 5 are connected to one another at the end of this closed circuit—which end is far away from the control device area 2; thus the transmission line section 6 and the reception line section 7 form the actual closed circuit 5.

Station groups comprising a number of stations are connected to the closed circuit 5. Two such station groups 8 and 9 are indicated in FIG. 1. The stations of these station groups may in the present case be formed by subscriber stations (TS) or a so-called exchange transfer device (AUe). As will be seen these subscriber stations and the exchange transfer device are designed to receive or transmit digital signals, particularly PCM-signals.

The station group 8 may comprise only subscriber stations (TS) 22, 23. These subscriber stations 22, 23 are connected by their outputs in common to a transmisson trunk 12 of a station group multiplex line arrangement 10 which comprises this transmission trunk 12 and a reception trunk 13. The subscriber stations 22, 23 are connected to the reception trunk 13 of this multiplex line arrangement 10 by their reception inputs. The two trunks 12, 13 of the multiplex line arrangement 10 are connected to the transmission line section 6, respective the reception line section 7 of the closed circuit 5 through an amplifier arrangement 16 and a shutoff device 17. For this purpose the respective trunks 12, 13 also have a number of individual lines that at least corresponds to the number of signal bits of a digital signal that are to be simultaneously transmitted, which is again indicated by a short diagonal line through the respective trunk. In addition, the respective trunk can comprise clock and/or synchronization signal lines that lead to the individual stations and control these.

The station group 9, which is also indicated in FIG. 1, comprises the subscriber stations 24, 25 and the already mentioned exchange transfer device 26. These subscriber stations 24, 25 and the exchange transfer device 26—which is configured to allow the transmission of digital signals to and/or from other signal reception respective signal transmission devices—are jointly connected to a transmission trunk 14 by their transmission outputs and to a reception trunk 15 by their reception inputs. The transmission trunk 14 and the reception trunk 15 belong to another station group multiplex line arrangement 11, which is connected to the closed circuit 5 by its trunks 14, 15 via an amplifier arrangement 19 and a shutoff device 20 in a manner corresponding to that described for station group 8 above.

A monitoring device (FE) is associated to each station group according to FIG. 1. The monitoring device 16 is associated to the station group 8, and the monitoring device 21 is associated to the station group 9. These monitoring devices 18, 21 are respectively connected with the transmission trunk 12, respective 14 of their associated station group 8, respective 9. On the other hand, the monitoring devices 18, 21 are connected with the control device area 4 of the central control device 1 by their inputs. From this control device area 4 the monitoring devices 18, 21 can be successively called up to execute their monitoring functions. These monitoring functions may be to determine, on the respectively associated transmission trunks 12, respective 14, whether time slots that are nominally blocked for connection purposes are actually free; if such time slots are detected to be seized, the respective monitoring device may transmit a corresponding error indication signal. This will be discussed in greater detail below.

The previously considered monitoring devices 18, 21 are each connected by their outputs with the control input of their associated shutoff devices 17, respective 20. These shutoff devices 17, 20 are merely shown to contain switches, respective relay contacts in FIG. 1. Upon selection by the associated monitoring device 18, respective 21, or by the central control device 1—after error correction in the stations in question, attempted by the central control device 1 through command transmission, has remained unsuccessful—they will disconnect their associated station group 8 or 9 from the closed circuit 5. If applicable, the procedure may be to merely disconnect the transmission branch of the respective station group 8 respective 9, so that the stations belonging to the respective station group (subscriber stations or exchange transfer devices) are still available for incoming connection traffic.

The stations shown in FIG. 1—i.e., the subscriber stations 22, 23, 24, 25, and the exchange transfer device 26—are also connected to the control device area 3 of the central control device 1 through separate connections. As already mentioned above, this control device area 3 may be a command control circuit which successively checks the individual station circuits for their state or desired connections. This includes requests for making and breaking connections. The individual stations can be cyclically queried and respectively scanned. An individual command trunk is preferably provided for each station group, equipped for serial bit transmission. In this case the individual stations 22 to 26 of the circuit arrangement can be individually selected through output of the corresponding station addresses via the respective command trunk, in order to then transmit required status signals to the central control device 1 via this command trunk.

The above explained circuit arrangement, illustrated in FIG. 1, operates as follows. Since both the line sections 6 and 7 forming the closed circuit 5 and the trunks 12, 13, respective 14, 15 of the station group multiplex line arrangements 10, 11 each contain a number of individual lines that at least corresponds to the number of signal bits of a digital signal that are to be simultaneously transmitted, parallel transmission of the signal bits forming the digital signals, as of the bits of PCM-signals, is possible.

The digital signals that are to be transmitted between stations that are to be or are connected are transmitted in parallel, together with their respective signal bits, by the time division multiplex principle, namely in cyclically repeated time slots of the so-called pulses occurring in successive pulse frames that are allocated to the respective stations. The pulse allocated to one station as transmission pulse serves other stations as reception pulse. The allocation of such pulses to the individual stations will be discussed in greater detail in connection with FIG. 4 below.

In order to clarify the relevant time relations, a PCM-system with 32 transmission channels at eight bits will be assumed. In such a PCM-system 32 time sections or time slots at eight bits are available within each of the successive pulse frames. Given a pulse frame duration of 125 μs, the cyclically repeated time slots occurring in successive pulse frames therefore have a repetition rate of 8 kbit/s. The successive time slots occur with a repetition rate of 32.8 kbit/s, i.e., 256 kbit/s. All bits contained in the time sections of a pulse frame occur with a repetition rate of 8.32.8 kbit/s, i.e., 2.048 Mbit/s. With respect to the parallel transmission of the signal bits forming the respective digital signal in the circuit arrangement according to FIG. 1, a total of 256 time slots are available for a signal transmission on the closed circuit 5, assuming a PCM-system of the above considered kind. This means, on the basis of normal traffic loads, about 1000 subscriber stations can easily be connected to such a circuit arrangement. Every such time slot (1 bit wide) corresponds to a transmission rate of 8.3 kbit=64 kbit, if a closed circuit with eight individual lines is used. At this point it should be noted that of all the pulses that can be placed on the closed circuit 5, at least one pulse is firmly allocated to signal generators, which are required for signal outputs and may be connected to the closed circuit 5 as mentioned in connection with the control device area 2 above, as transmission pulse. During the durations of the occurrence of the time slots of such a transmission pulse no signals must be transmitted on the transmission trunks 12, 14 of the station group multiplex line arrangements 10, 11, since such signals might lead to falsification or modification of the signaling signals emitted by the correspondingly provided signal generators, after their transmission to the transmission line section 6 of the closed circuit 5. In the present case, however, the fact that the time slots of the respective transmission pulses must not be seized by signals on the transmission trunks of the station group multiplex line arrangements, is utilized to evaluate the serviceability or faultiness of the respective station group 8, respective 9. As already mentioned above, the monitoring device 18, respective 21 of the station group 8 or 9, is then checking whether time slots are seized in the respective transmission trunk, which are certainly not available for connection purposes.

Figure 2:
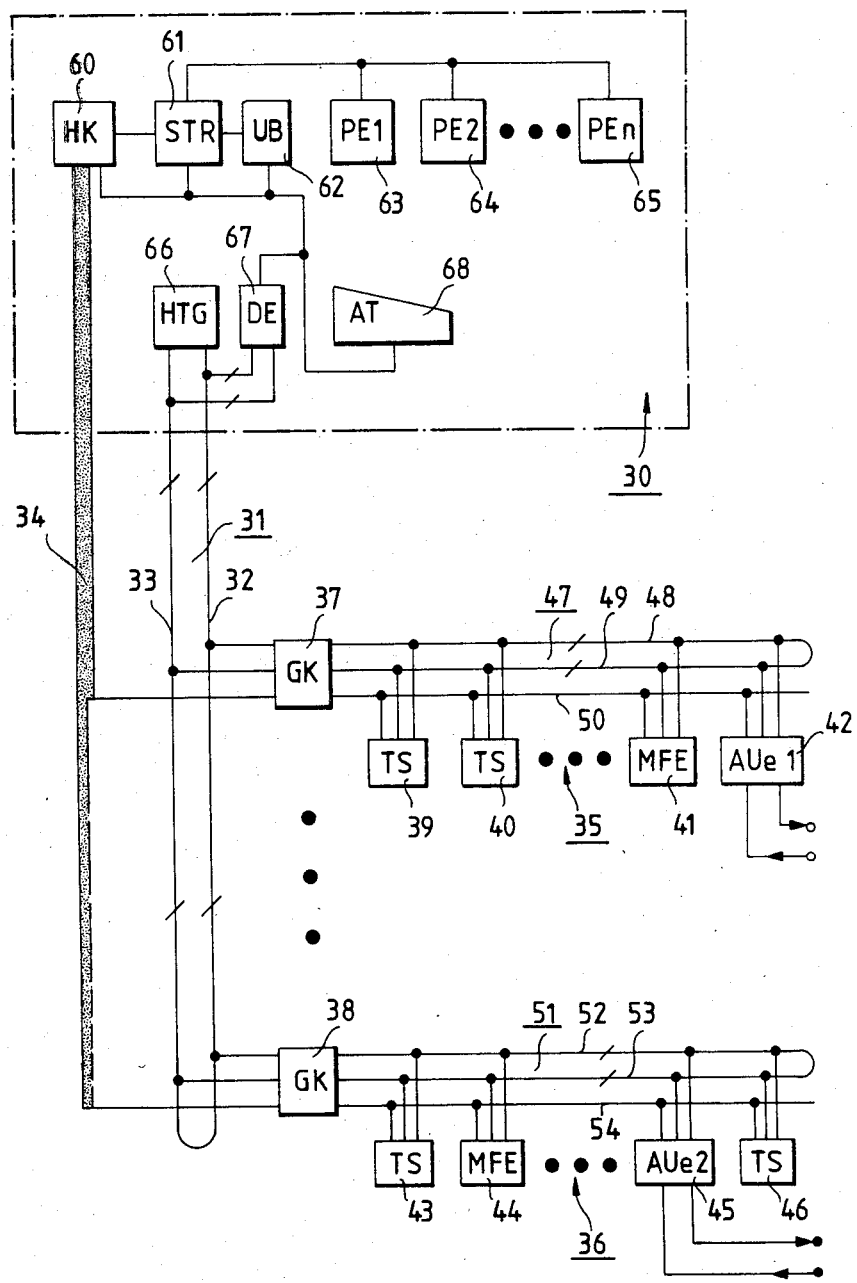
FIG. 2 shows a second embodiment of a circuit arrangement according to the invention in the form of a block diagram.

FIG. 2 illustrates a modification of the circuit arrangement shown in FIG. 1. The circuit arrangement shown in FIG. 2 comprises a central control device 30, a closed circuit 31 with a transmission line section 32, and a receiving line section 33, a command or control line arrangement 34, and station groups 35, 36. The transmission line section 32 and the reception line section 33 of the closed circuit 31 in the present case also have a number of individual lines that correspond to at least the number of signal bits of a digital signal that are to be simultaneously transmitted, which is indicated with short diagonal lines through the respective line sections. The transmission line section 32 and the reception line section 33 of the closed circuit 31 are connected at their ends with each other by corresponding individual lines.

The central control device 30 shown in FIG. 2 contains a so-called main coupler (HK) 60, which selects the individual stations groups 35, 36 successively and receives commands or monitoring information from them and transmits control information to them. The main coupler 60 is connected with a control computer (STR) 61, to which a monitoring unit (UB) 62 may be associated. The main coupler 60, the control computer 61, and the monitoring unit 62 may also be provided in duplicate.

The control computer 61 is connected with a number of peripheral units (PE 1, PE 2 . . . PEn) 63, 64, 65, according to FIG. 2. These peripheral devices may be data memories or devices with which the control computer 61 must work to fulfill its tasks.

The main coupler 60, the control computer 61, and the monitoring unit 62 are also connected with a diagnostic unit 67, which is connected to the transmission line section 32 and the reception line section 33 of the closed circuit 31 through additional connections. The main coupler 60, the control computer, and the monitoring unit 62 are also connected with a monitoring and display console (AT) 68. A so-called audio signal generator (HTG) 66 is also connected to the transmission line section 32 and the reception line section 33 of the closed circuit 31 in accordance with FIG. 2 and is indicated as part of the central control device 30.

As in the circuit arrangement shown in FIG. 1, the individual station groups 35, 36 are connected to the closed circuit 31 by their respective transmission outputs as well as their respective reception inputs in the circuit arrangement shown in FIG. 2. In the present case this connection is establshed via so-called group couplers (GK), however, with a group coupler 37 associated to the station group 35 and a group coupler 38 being associated to the station group 36. In principle these group couplers 37, 38 are circuits which comprise the circuit devices 16, 17, 18, respective 19, 20, 21 of the circuit arrangement shown in FIG. 1. The respective group couplers 37, 38 now connect not only corresponding trunks or group-individual lines with the transmission line section 32 and with the reception line section 33 of the closed circuit, but they are also connected to the line arrangement 34 with at least one additional connection.

The group coupler 37 associated to the terminal group respective station group 35 is also connected with a closed circuit 47, which may comprise a transmission line section 48 and a reception line section 49. The transmission line section 48 and the reception line section 49 of the closed circuit 47 each also have a number of individual lines that correspond to at least the number of signal bits of a digital signal that are to be simultaneously transmitted; corresponding individual lines are connected with each other, at one end of the line, or are closed off with the respectively applicable surge impedance. The presence of such individual lines is indicated by short diagonal lines crossing the transmission line section and the reception line section. Apart from the closed circuit 47, the group coupler 37 is also connected with a control command line 50, which may be designed for serial data transmission.

The stations belonging to the station group 35 may be connected to the transmission line section 48 of the closed circuit 47 by their respective transmission outputs. These stations are, on one hand, subscriber stations (TS), two of which subscriber stations 39, 40 are indicated. They are also a multifrequency receiver (MFE) 41 and a so-called exchange transfer device (AUe 1) 42, which enables connections with other signal receiving respective signal transmitting devices, e.g., another exchange. The multifrequency receiver 41 may, for example, be a data station. The terminals 39, 40, 41, 42 which belong to the station group 35 are connected to the reception line section 49 of the closed circuit 47 by their respective reception inputs. The respective stations 39 to 42 are connected to the control command line 50 with a control respective query connection.

A closed circuit 51 is connected to the group coupler 38 associated to the station group 36, which contains a transmission line section 52 and a receiving line section 53. These two line sections 52, 53 also each have a number of individual lines that correspond at least to the number of the signal bits of a digital signal that are to be simultaneously transmitted, which is indicated by a short diagonal line through the respective line section. The corresponding individual lines of these two line sections 52, 53 are also connected with each other at their ends, or terminated in the already specified manner. The stations 43, 44, 45, 46 are connected with the transmission line section 52 of the closed circuit 51 by their respective transmission outputs. The stations 43 and 46 may be subscriber stations; the station 44 may be comprised of a multifrequency receiver or a data station, and station 45 may be another exchange transfer device AUe 2. These stations 43 to 46 are connected to the reception line section 53 of the closed circuit 51 by their reception inputs. The respective staions 43 to 46 are connected to the control command line 54 with control connections.

In principle the circuit arrangement of FIG. 2 operates in the same manner as the circuit arrangement shown in FIG. 1. On the basis of the numerical example explained in connection with FIG. 1, a total of 256 pulses can therefore be present on the closed circuit 31 and on the closed circuits 47 and 51 for connection with a corresponding number of stations. In fact, however, at least one such pulse is reserved for the signaling output here, too, so that it is not available for the actual signal transfer between two stations.

As already explained in connection with the circuit arrangement illustrated in FIG. 1, the pulse allocated to one station as transmission pulse here, too, serves as reception pulse for another station connected to the respective station, and the pulse allocated to this other station as transmission pulse serves as reception pulse for the first named station. Given the total of 256 pulses available on the closed circuits 31, 47, and 51, a total of 128 connections are theoretically possible between two stations. The allocation of the individual pulses as transmission or reception pulses to individual stations will be discussed in greater detail in connection with FIG. 4 below.

In contrast with the circuit arrangement shown in FIG. 1, the stations belonging to the respective station group according to the circuit arrangement of FIG. 2 may be connected with each other in case the associated group coupler is defective. The digital signals transmitted by such stations to the transmission line section of the associated closed circuit 47 respective 51 also occur on the reception line section of this closed circuit. Hence these signals can be received by the stations of the respective station group, without being transmitted through the closed circuit connected with the central control device, as in FIG. 1. This last mentioned characteristic of the circuit arrangement shown in FIG. 2 may incidentally also be used to block the group coupler of a station group during so-called internal traffic between stations of a single station group, so that one and the same pulse can then be utilized for signal transmission in different station groups.

Figure 3:
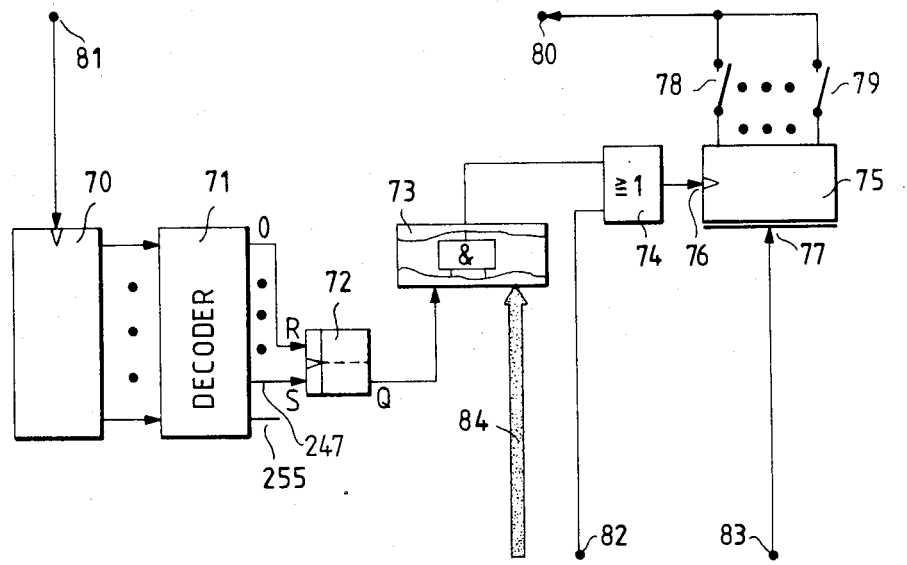
FIG. 3 shows one possible structure of one of the devices provided in the circuit arrangements according to FIGS. 1 and 2.

FIG. 3 shows the block diagram of a possible structure of one of the monitoring devices 18, 21 indicated in FIG. 1. The circuit arrangement shown in FIG. 3 will be contained as monitoring circuit arrangement in the group couplers 37, 38 of the circuit arrangement shown in FIG. 2 as well. The circuit arrangement of FIG. 3 contains a counter 70, which receives clock impulses in the rhythm of the time slots occurring within each pulse frame over a connection 81. On the basis of the numerical example given in connection with the circuit arrangement according to FIG. 1, the counter 70 receives a total of 256 impulses during a 125 µs pulse frame.

A decoder 71 is connected to the output of the counter 70 by its input. This decoder 71 has a total of 256 outputs 0 to 255. Upon input selection it transmits an output signal at only one of its outputs (binary signal "H"-High).

A bistable flip-flop 72 is connected to the output 0 of the decoder 71 by its reset input R. By its set input S the bistable flip-flop 72 is connected to the output 247 of the decoder 71. With an output Q the bistable flip-flop 72 is connected to the input of a comparator arrangement 73, which may be connected by another input to a bus 84, which may be one of the transmission trunks 12, 14 of the circuit arrangement according to FIG. 1 or one of the transmission line sections 48, 52 of the circuit arrangement according to FIG. 2. The comparator arrangement 73 thus checks for signals occurring on the respective trunk 84 at the moment of the appearance of the pulses respective time slots 247 to 255 inclusive. As explained above, the respective pulses or time slots are not to be used for signal transfer between stations of the circuit arrangement; they are rather used for a signaling output. Hence no signals may actually occur on the trunk 84 at the respective time slots or pulses. If such a signal is nonetheless detected, the comparator arrangement 73 originates a binary signal "H" at its output as output signal. The comparator arrangement 73 can only output such an output signal until the time when the bistable flip-flop 72 is reset. This is the case at the time when the pulse or time slot 0 occurs. In this case the decoder 71 transmits a corresponding reset signal from its output 0 to the reset input R of the bistable flip-flop 72.

An OR-element 74 is connected by an input to the already mentioned output of the comparator arrangement 73. By another input the OR-element 74 is connected to a circuit point 82 which will be discussed below. By its output the OR-element 74 is connected to a counter input 76 of a counter 75. This counter 75 is connected by a reset input 77 to a circuit point 83, which will also be discussed. The counter outputs that will carry an output signal (binary signal "H") at different counter positions are jointly connected to a circuit point 80 through switches 78, 79. Depending on which switch 78, 79 is closed, an output signal is transmitted to the connection point 80 at a greater or lesser counter position. This output signal (binary signal "H") may be the error indication signal mentioned in connection with the monitoring device 18 respective 21 according to FIG. 1, which serves to control the associated shut-off device. By selection of the switch to be closed among the provided switches 78, 79, the number of errors can be selected, after which a corresponding shut-off measure will be executed.

The counter 75 is advanced in its counter position not only when a corresponding output signal is given at the output of the comparator arrangement 73 (binary signal "H"), but also if a corresponding error indication signal is transmitted to connection 82. It is therefore possible to transmit error indication signals to connection 82 from other error monitoring devices that are not shown in FIG. 3. Reset signals can be transmitted to connection 83 for resetting the counter 75 to a defined original state. Such reset signals may, for example, be transmitted to the connection 83, if no errors have occurred during a certain number of pulse frames. In the simplest case such a reset signal may be transmitted when no error has occurred in one pulse frame. For this purpose the output of an AND-element could be connected with the connection point 83, which is connected to the output 255 of the decoder 71 by an input and to the output (Q̄) of a bistable flip-flop, which is connected to the output 0 of the decoder by a reset input and to the output of the above mentioned OR-element 74 by a set input, by another input. The AND-element that is connected to the connection point 83 by its output then transmits a reset signal (binary signal "H") to the counter 75 at the end of each pulse frame, only if no counter advance signal has occurred during this pulse frame.

Figure 4:
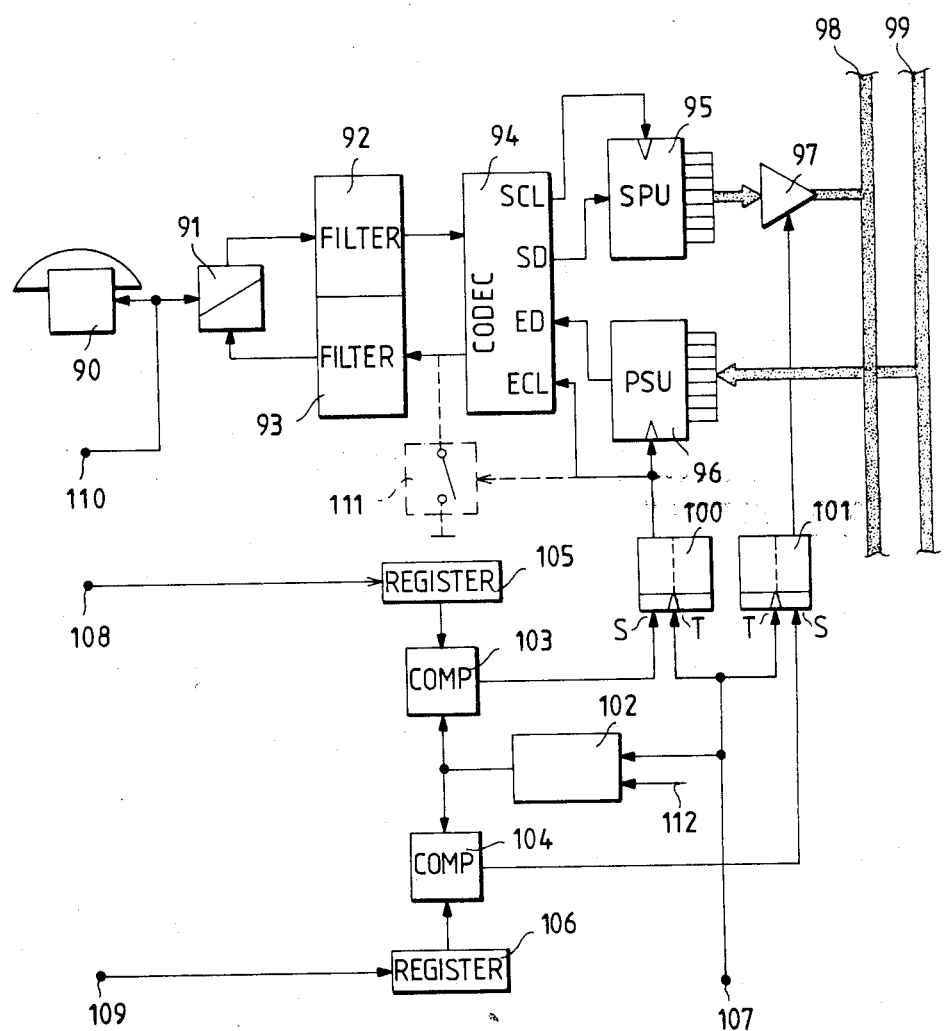
FIG. 4 shows a subscriber station circuit block diagram of the circuit arrangement according to FIG. 1 or 2.

FIG. 4 illustrates one possible structure of one of the stations indicated in FIGS. 1 and 2. The stations illustrated in FIG. 4 may be a telephone subscriber station, whose actual subscriber station 90 is designed for the transmission and reception of analog signals. This subscriber station 90 is connected with a transmission filter 92 and a reception filter 93 over a hybrid 91. These filters 92, 93 may be low pass filters. The output of filter 92 and the input of filter 93 are connected with the corresponding connections of a coding-decoding arrangement 94, called codec. This codec converts the analog signals received into PCM-signals comprising eight bits each and outputs analog signals upon receiving of the corresponding PCM-signals.

The codec 94 is connected with the input of a serial-parallel converter 95, which may be a shift register, by a signal output SD which outputs the PCM-signal bits serially. Corresponding clock impulses are input to a separate clock input of this serial-parallel converter 95 by a clock output SCL of the codec 94. With its eight parallel outputs the serial-parallel converter 95 is connected with a transmission trunk 98, which may be one of the transmission group trunks 12, 14 indicated in FIG. 1 or one of the transmission line sections 48, 52 of the circuit arrangement according to FIG. 2, via a disconnect circuit arrangement 97.

The codec 94 is connected to the serial output of a parallel-series converter 96, which may also be a shift register, by an input ED which receives PCM-signal bits serially. This parallel-series converter 96 is connected to a receiving trunk 99 by its eight parallel inputs, which may be one of the receiving trunks 13, 15 of the circuit arrangement according to FIG. 1 or one of the receiving line sections 49, 53 of the circuit arrangement according to FIG. 2. The parallel-series converter 96 is connected to the output of a bistable flip-flop 100, which together with other, yet to be considered devices 101 to 106, forms a holding set circuit associated to the respective subscriber station, by an unspecified clock input, together with a clock input ECL of the codec 94. This bistable flip-flop 100 is connected to the output of a comparator (Comp) 103 by a set input S. By a clock input T the bistable flip-flop 100 is connected to a connection point 107 to which clock impulses are transmitted in the rhythm of the time slots or pulses which are relevant on the closed circuits of the circuit arrangements according to FIGS. 1 and 2.

A further bistable flip-flop 101 is also connected to the previously mentioned circuit point by a clock input T. This bistable flip-flop 101 is connected to the output of another comparator (Comp) 104 by a set input S. With one output the respective bistable flip-flop 101 is connected to a control input of the disconnect circuit arrangement 97.

By their inputs the two mentioned comparators 103 and 104 are jointly connected to the output of a counter arrangement 102, one of whose inputs is also connected to the connection point 107 and whose input 112 is connected to the synchronization signal line. By another input the comparator 103 is connected to the output of a register (Reg) 105, which has an input connected to the circuit point 108. By another input the comparator 104 is connected to the output of another register (Reg) 106, which has an input connected to a circuit point 109. The two comparators 103, 104 thus compare the counter position of the counter arrangement 102 with the content of the respective register 105, respective 106. The code combinations contained in the two registers 105 and 106 represent pulse addresses in a sense. The code combination contained in register 106 represents a transmission pulse address, and the code combination contained in register 105 represents a receiving pulse address. These pulse addresses therefore designate those pulses that are allocated to the respective subscriber station as transmission, respective reception pulse. The respective counter position of counter arrangement 102 which, as cyclically operated counter arrangement, can be set to a number of counter positions that corresponds to the number of pulses available for a signal transmission on the closed circuits according to FIGS. 1 and 2 during the duration of each of the relevant pulse frames on these closed circuits, is compared with these pulse addresses.

When it detects agreement between the compared signals respective code combinations, the respective comparator 103 respective 104 emits an output signal (binary signal "H") from its output, upon whose occurrence in combination with a clock impulse, the associated bistable flip-flop 100, respective 101 is controlled in such a way that it emits a binary signal "H" from its output. If such an input signal is lacking, and when a clock impulse occurs at the respective bistable flip-flop 100, respective 101, it is returned to its other state.

The pulse addresses to be transmitted to the registers 105, 106 are transmitted to the connection points 108, 109 by the central control device according to FIG. 1 or according to FIG. 2. The address bits forming the respective pulse addresses are serially transmitted over corresponding lines.

In the circuit arrangement shown in FIG. 4 the subscriber station 90 is also connected with a connection point 110. A subscriber monitoring circuit may be connected to this connection point 110, which may be provided per station group in the circuit arrangement shown in FIG. 1 or in FIG. 2. In the circuit arrangement according to FIG. 1 such a monitoring circuit will be contained in the control device component 3 of the central control device 1, and in the circuit arrangement shown in FIG. 2 this monitoring circuit may be contained in the respective group coupler 37, respective 38.

In the circuit arrangement shown in FIG. 4 a key switch 111 is indicated by broken lines between the analog signal output of the codec 94 and the input of the reception filter 93, which enables to switch the respective connection between the codec and the filter 93 to earth or ground. For this purpose the respective key switch 111 is supplied with control signals that may be derived from the output impulses of the bistable flip-flop 100, for which purpose a time element may be contained between the output of the respective bistable flip-flop and the activation input of the key switch 111. The closing of the key switch 111 causes the analog signal emitted from the output of the codec 94 not to be transmitted to the filter 93 for the duration of practically one pulse frame, but only during a relatively shorter time period. Hence the circuit arrangement shown in FIG. 4 is especially suitable for the inclusion of a thusly structured subscriber station in a conference call connection. In such a conference call connection the individual subscriber stations need only be allocated reception pulses corresponding to the transmission pulses of the remaining subscriber stations included in the respective conference call connection. In terms of the circuit structure shown in FIG. 4 this means that additional registers corresponding to register 105 should be made available which would all be output-connected with the comparator 103. In this case the comparator 103 would emit a repeated output signal (binary signal "H") during the duration of each pulse frame and thus transmit PCM-signals occurring on the reception trunk 99 to the codec 94 with a corresponding frequency. After emission of the analog signal corresponding to each such digital signal by the codec 94 to the filter 93, the switch 111 is then to be closed briefly. With reference to one pulse frame, therefore, an addition of the analog signals corresponding to the respectively transmitted digital signals takes place in the subscriber station, i.e., in the filter 93. Hence more than one decoding process takes place in the codec 94 within each pulse frame.

In order to allow adding several analog signals in the receiver filter 93 within a pulse frame, the duty factor T of the analog signals derived from digital signals must be such, that it satisfies the relationship $$T \geq T_d/T_o,$$

where td is the decoding time of a digital signal and hence the minimum time interval between two reception pulses, respective reception time slots to be considered and To the duration of a pulse frame. This duty factor T incidentally also defines the required amplification of an amplifier following the filter 93. The shorter the decoding time of the codec 94 is, the more subscriber stations can be included in a conference call connection, and the greater must be the amplification of the amplifier following the filter 93. In the circuit arrangement shown in FIG. 4 the cited duty factor T is accordingly adjusted by activation of the key switch 111.

In closing it should be noted, that—as previously explained in connection with conference call connections—one can proceed accordingly in the terminals, in order to feed separate audio signals or tones into existing connections. In this case two different reception pulses are allocated to the respective station, at least temporarily.

Instead of several registers 105 and a comparator 103, a memory may be provided in the conference circuit, which is addressed by the counter arrangement 102. The storage capacity must then correspond to the number of all the available time slots and amount to 256, for example. The storage locations provided for the reception pulses are set to the logical state 1 by the central control. By addressing with the counter arrangement 102, the control signal for the bistable flip-flop 100 appears at the memory output.

If a large number of time slots is used, the pulse width on the closed circuit is relatively short. In this case the transit time on the closed circuit is longer, relative to the pulse width. In this case it is indicated to transmit clock and synchronization signals along on the closed circuit. This assures that an existing phase relationship between clock signals and information signals is maintained. It is then indicated to select the synchronization counter arrangement 102 and the bistable flip-flop 100 in the circuit shown in FIG. 2 with the clock signals 107 and the synchronization signal 112, which are both transmitted along in the reception line section 99. For transmission synchronization a separate counter is then required, which together with the bistable flip-flop 101 is then selected by signals that are transmitted along in the transmission line section 98.

Figure 5:
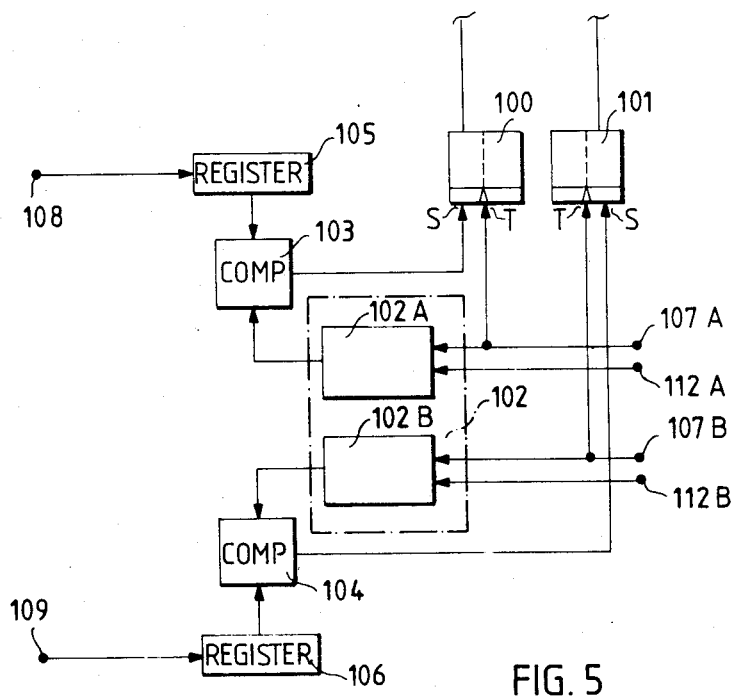
FIG. 5 is a block diagram showing a section of the switching arrangement, shown in FIG. 4.

A section of the circuit in accordance with FIG. 4 is shown in FIG. 5. It shows the partition of the counter arrangement 102 into two counters 102A and 102B. Each of the two counters 102A and 102B has two inputs. One input is connected to the cycle input of bistable flip-flop 100, respectively 101. The other input is connected to the converting point 112A, respectively 112B, for the synchronization signal. The first input is connected to the connecting point 107A, respectively 107B for the clock signal.

Counter 102A is provided for the receiving direction, counter 102B for the transmitting direction. The use of separate counters 102A and 102B renders possible the equalization of differences in transmission time for the pulse signals along the closed circuit. The clock signal 107 and the synchronization signal arrive along their path via the closed circuit, first at connecting point 107B, respectively 112B of the transmission branch, and then delayed at connecting point 107A respectively 112B of the receiving branch.

Thus, both counters 102A and 102B work in a phase related manner relative to one another and with respect to transmission along the closed circuit.

Furthermore, the circuit of computers 103 and 104, shown in FIG. 5, as well as register 105 and 106, correspond to the circuit, shown in FIG. 4.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a circuit for the control of the transmission of pulse code modulated (PCM) signals between a plurality of stations over a closed circuit parallel PCM time-division multiplex channel, said plurality of stations being arranged in a plurality of groups, each group being connected by a pair of transmitting and receiving trunks to said closed circuit time-division multiplex channel, said multiplex channel having a number of individual lines at least equal to the number of encoded bits of a PCM signal, each transmitting trunk of a pair connecting a group of stations to said multiplex channel through a plurality of individual transmitting lines connected to corresponding individual lines of said multiplex channel, and each receiving trunk of a pair connecting a plurality of individual receiving lines to corresponding individual lines of said multiplex channel, a central control system having an address control unit comprised of means for selectively connecting said pairs of trunks to said closed circuit time-division multiplex channel and disconnect means for selectively disconnecting at least the transmission trunk of any of said group of stations, a synchronizing signal generator, said closed circuit time-division multiplex channel and each receiving trunk of each group of stations having a single line for distribution of said synchronizing signal to all connected stations, and a clock signal generator, said closed circuit time-division multiplex channel and each receiving trunk of each group of stations having a single line for distribution of said clock signal to all connected stations for synchronous time-division multiplex transmission and reception of signals by said stations over said closed circuit time-division multiplex channel during preassigned time slots.

2. A circuit as defined in claim 1 wherein said central control means includes means for monitoring the state of each station of each group, and addressing control means with which individual monitoring means may be controlled for selectively connecting and disconnecting transmission and receiving trunks of said groups of stations.

3. A circuit as defined in claim 2 wherein said disconnect means for selectively disconnecting at least the transmission trunk of any of said groups includes means for separately monitoring each group of stations for sensing transmission errors associated with the group based on preselected criteria, and means for activating said disconnect means to disconnect the transmission trunk of the associated group when the number of transmission errors sensed exceeds a preselected number.

4. A circuit as defined in claim 3 wherein said central control means includes clock means and said monitoring means include means responsive to said clock means for defining a plurality of clock periods during which parallel PCM signals are time-division multiplexed between said stations, and further defining at least one clock period during which parallel PCM signals are not to be communicated between stations, and including means for indicating an error when digital signals are transmitted from any station of the group during said at least one clock period of no PCM signal transmission.

* * * * *